(12) United States Patent
Thakre et al.

(10) Patent No.: US 7,017,418 B1
(45) Date of Patent: Mar. 28, 2006

(54) SYSTEM AND METHOD FOR SENSING PRESSURE

(75) Inventors: Parag Thakre, Bhilai (IN); Shankar Chandrasekaran, Chennai (IN); Kuna Venkat Satya Rama Kishore, Bangalore (IN); Russell William Craddock, Nuneaton (GB)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/012,417

(22) Filed: Dec. 15, 2004

(51) Int. Cl.
*G01L 15/00* (2006.01)

(52) U.S. Cl. .......................................... 73/716; 73/718
(58) Field of Classification Search ..................... None
See application file for complete search history.

(56) References Cited

U.S. PATENT DOCUMENTS

| | | | | |
|---|---|---|---|---|
| 4,669,316 | A * | 6/1987 | Olsen et al. .................. | 73/717 |
| 5,165,289 | A * | 11/1992 | Tilmans ....................... | 73/702 |
| 5,275,055 | A * | 1/1994 | Zook et al. ................... | 73/778 |
| 5,357,807 | A * | 10/1994 | Guckel et al. ................ | 73/721 |
| 5,417,115 | A | 5/1995 | Burns ........................... | 73/778 |
| 5,458,000 | A * | 10/1995 | Burns et al. .................. | 73/708 |
| 5,511,427 | A * | 4/1996 | Burns ........................... | 73/708 |
| 5,672,808 | A * | 9/1997 | Klauder et al. .............. | 73/1.59 |
| 6,796,185 | B1 | 9/2004 | Kurosawa et al. ........... | 73/716 |
| 2004/0040384 | A1 | 3/2004 | Kurosawa et al. ........... | 73/716 |

FOREIGN PATENT DOCUMENTS

EP 1394522 A2 3/2004

OTHER PUBLICATIONS

R. A. Buser and N. F. De Rooij; "Very high Q-factor resonators in monocrystalline silicon"; Sens. Actuators, vols. A21-A23, pp. 323-327, 1990.
H. Zhang and E.S. Kim; "Dome-Shaped Diaphragm Microtransducers"; MEMS '95, IEEE International Workshop on Micro Electro Mechanical Systems (Amsterdam, Netherlands), Jan. 29-Feb. 2, 1995, pp. 256-260.
Thierry Corman, Peter Enoksson and Göran Stemme; "Low Pressure Encapsulated Resonant Structures with Integrated Electrodes for Electrostatic Excitation and Capacitive Detection"; Sensors and Actuators A 66 (1998) 160-166.
Burns, D. W., Zook, J. D., Horning, R. D., Herb, W. R., and Guckel, H.; "Sealed-cavity resonant microbeam pressure sensor"; Sensors Actuators, 48, 179-186 (1995).
E. Stemme and G. Stemme; "A balanced resonant pressure sensor"; Sens. Actuators, vols. A21-A23, pp. 336-341, 1990.
R. A. Buser, N. F. de Rooij, and L. Schultheis, "Silicon pressure sensor based on a resonating element"; Sens. Actuators, vols. A25-27, pp. 717-722, 1991.
M. K. Andrews, P. D. Harris, G. C. Turner and I. M. Harris; "A miniature resonating pressure sensor"; Microelectronics Journal vol. 24, Issue 7, Nov. 1993, pp. 831-835.

* cited by examiner

*Primary Examiner*—Harshad Patel
(74) *Attorney, Agent, or Firm*—Fletcher Yoder

(57) ABSTRACT

A differential pressure sensor for use in an industrial application is described. The differential pressure sensor includes a membrane layer having a covered portion and an exposed portion where a first side of the exposed portion of the membrane layer is in fluid communication to a first aperture and a second side of the exposed portion is in fluid communication to a second aperture. The differential pressure sensor also includes at least one resonating device secured to the covered portion of the membrane layer and configured to oscillate at a desired frequency and a sensing circuitry configured to a detect oscillation in the at least one resonating device indicative of deformation in the membrane layer.

17 Claims, 7 Drawing Sheets

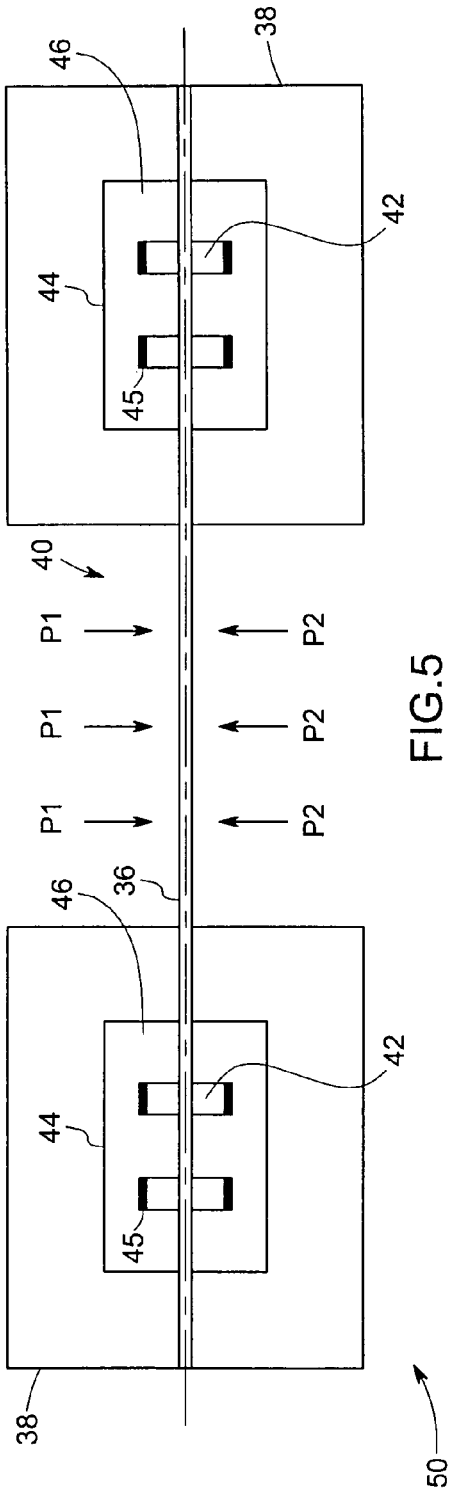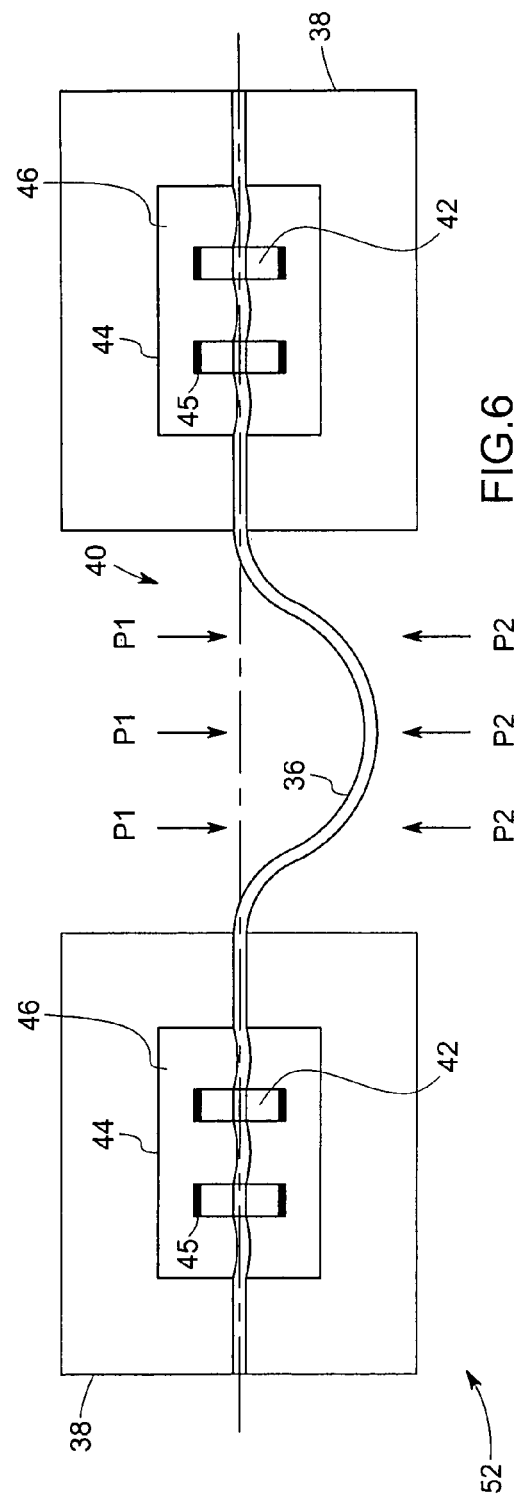

SYSTEM AND METHOD FOR SENSING PRESSURE

BACKGROUND

The present invention relates generally to pressure sensors and, more particularly, to resonant differential pressure sensors, which are often employed in various industrial applications, for instance.

Traditional differential pressure sensors are designed to determine the differential pressure between the two sides and/or areas of the system, to provide data regarding the system. By way of example, traditional differential pressure sensors detect the pressure differential between two regions of interest by evaluating the net effect of the pressure forces of the two regions on a component or components of the sensor. Unfortunately, certain systems often present environments that are relatively harsh, and, these environments generally benefit from robust pressure sensors. For example, certain systems are exposed to relatively high-pressure and/or high-temperature environments, and the exposed components of the pressure sensor are generally robust enough to accommodate these pressures and/or temperatures.

However, in traditional differential pressure sensors, the features that facilitate operation in harsh environments can negatively impact the resolution of the sensor. That is to say, traditional pressure differential sensors that are robust enough to withstand high-pressure environments cannot detect a difference of pressure between the two regions of interest that is orders of magnitude less than the pressure difference in the environment. For example, traditional differential pressure sensors robust enough to with-stand pressures of 5000 pounds per square inch (psi), and beyond, generally do not have sufficient resolutional capabilities to detect a pressure differential of +/−10 psi, for instance.

There is a need, therefore, for improved methods and systems for differential pressure sensing.

BRIEF DESCRIPTION

In accordance with one exemplary embodiment of the present technique, a differential pressure sensor for use in a pressurized environment is disclosed. The exemplary pressure sensor includes a first housing layer having a first aperture extending therethrough and a second housing layer having a second aperture extending therethrough. The exemplary pressure sensor also includes a membrane layer that is disposed between the first and second housing layers and that has a covered portion and an exposed portion. The pressure sensor also includes at least one resonating device coupled to the covered portion of the membrane layer and configured to oscillate at a desired frequency. The exemplary pressure sensor further includes sensing circuitry configured to detect changes in the oscillations of the resonating device as a function of deformation of the membrane layer. By way of example, the differential pressure sensor is adapted to measure the differential pressure in an industrial application.

In accordance with another exemplary embodiment of the present technique, a method of manufacturing a differential pressure sensor is provided. The exemplary method includes etching one or more membrane layers to define regions for one or more mesas. The method further includes forming one or more back-etched silicon on insulators (BESOIs) corresponding to the regions etched on the membrane layers. The method further includes bonding the membrane layers to the besois and disposing resonating devices on the corresponding covered portion of the membrane layer.

These and other advantages and features will be more readily understood from the following detailed description of preferred embodiments of the invention that is provided in connection with the accompanying drawings.

DRAWINGS

FIG. 5 is a diagrammatical representation of a differential pressure sensor within an environment having no differential pressure in accordance with an exemplary embodiment of the present technique;

FIG. 6 is a diagrammatical representation of a differential pressure sensor within an environment having a differential pressure in accordance with an exemplary embodiment of the present technique;

DETAILED DESCRIPTION

Figure 1:
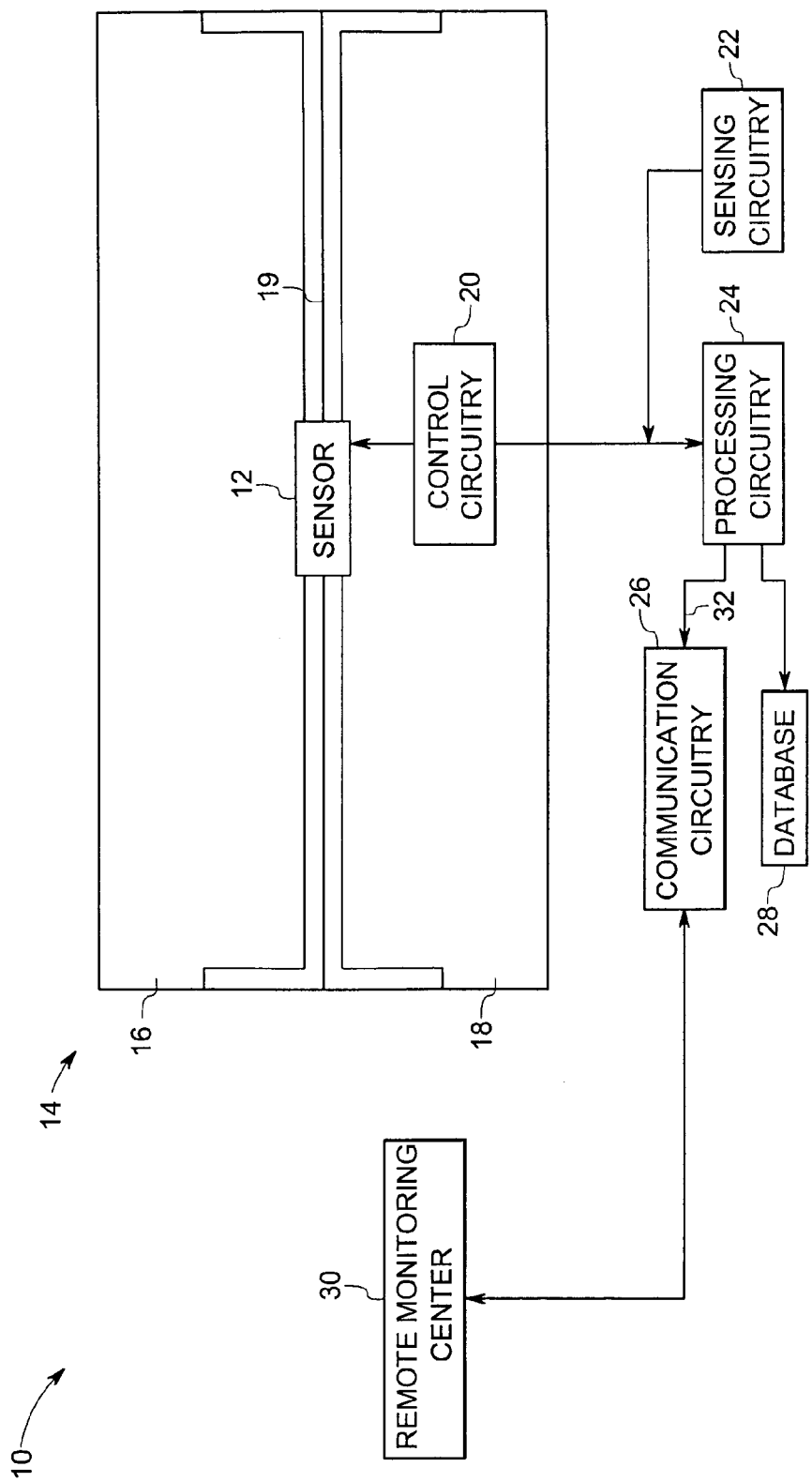
FIG. 1 is a diagrammatical view of a differential pressure sensor in accordance with an exemplary embodiment of the present technique.

FIG. 1 illustrates a diagrammatical view of an exemplary system 10 including a differential pressure sensor 12 for use in an industrial application. By way of example, industrial applications include piping applications, vessels and chemical manufacturing applications, pipelines, pressure chambers, flow devices or similar applications, to name but a few. The differential pressure sensor 12 is disposed in the industrial unit 14, such as a pressure chamber, a flow device, a pump line, or a mixing chamber, or similar applications as will be appreciated by those skilled in the art in view of the present discussion. The industrial unit 14 includes a first region 16 and a second region 18 at pressures that may be the same or different from another. The two regions 16 and 18 are isolated from one another by a barrier 19. The sensor 12 measures the pressure differential between two regions. The sensor 12 may measure low differential pressure in the range of about 0.1 pound square inch (psi) to about 15 psi and is robust enough to withstand a high static pressure of about 1000 psi to about 5000 psi, for example. By determining the net effect of pressure forces in the first and second regions on a component or a series of components of the pressure sensor 12, the sensor 12 determines the difference in pressure between the two regions. Indeed, the exemplary sensor 12, as discussed in more detail below, presents features that facilitate the measurement of relatively low pressure differential (e.g., +/−10 psi) as well as withstanding relatively high pressure environments (e.g., +/−5000 psi). Moreover, the exemplary sensor 12 presents features that facilitate the sensing of relatively high-pressure differentials as well.

Figure 3:
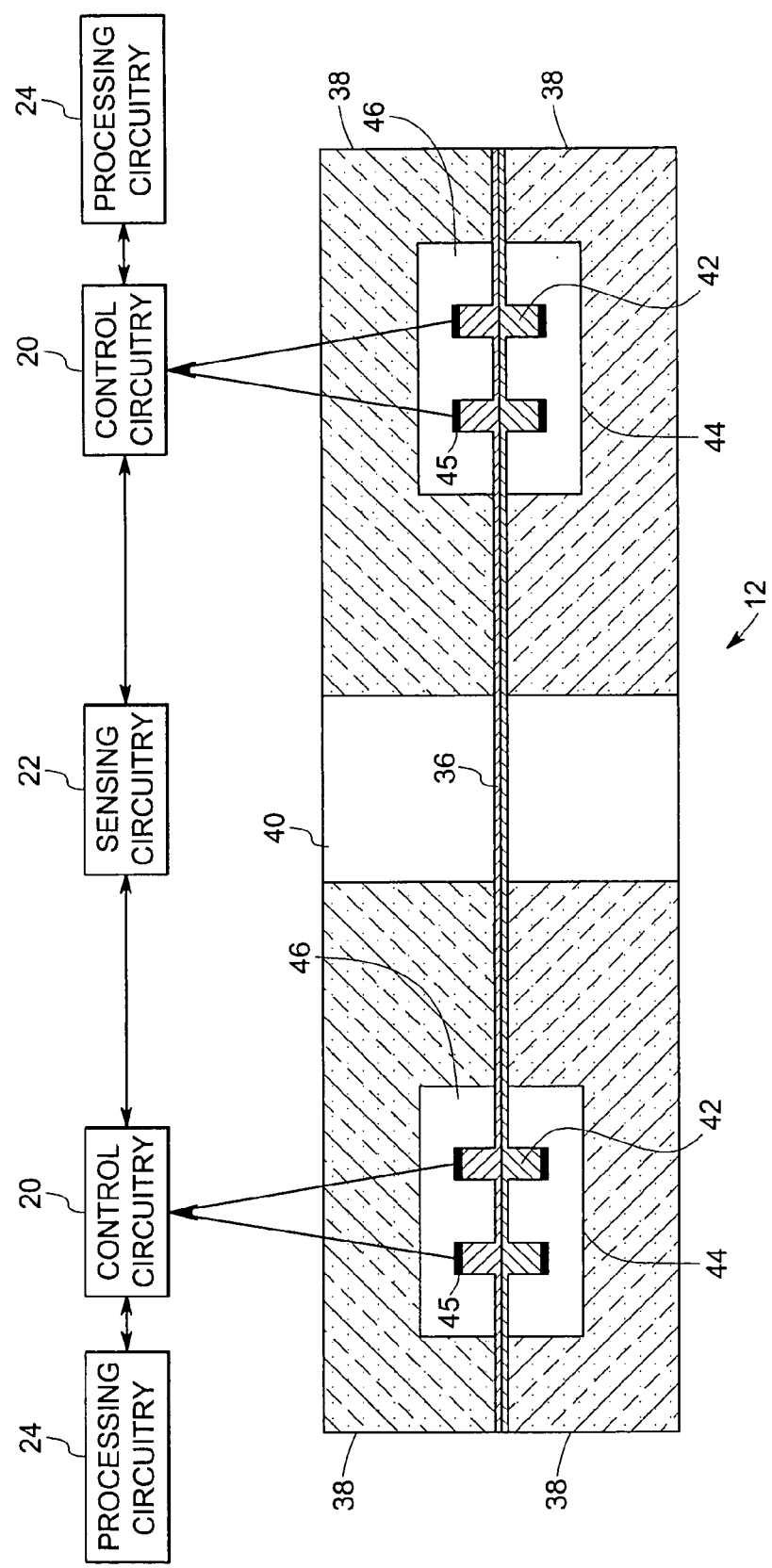
FIG. 3 is a cross-sectional view of the differential pressure sensor of FIG. 2 taken along line 3—3.

The system 10 includes other functional components associated with the differential pressure sensor 12: control circuitry 20, sensing circuitry 22, and processing circuitry 24, for example. The sensing circuitry 22 detects deformations of a membrane layer by measuring the changes in the oscillations of resonating devices present in the sensor 12 (as best illustrated in FIG. 3). The measurement of the changes in the oscillations of the resonating devices corresponds to the deformation of the membrane layer (as best illustrated in FIG. 3). In the sensor 12, sensing circuitry 22 detects those changes in the oscillations of the resonating devices. Output data from the sensing circuitry 22 is processed by the processing circuitry 24 for generating a value indicative of the differential pressure measured by the sensor 12. The system 10 further includes communication circuitry 26, a database 28, and a remote monitoring center 30. The database 28 is configured to store information pertinent and beneficial to the system 10, such as determined information about differential pressure in the environment and predefined information about the sensor 12, for example. The database 28 also is configured to store information from the processing circuitry 24 or the sensing circuitry 22, as may be needed for a particular application or use. As discussed further below, the database 28 may be located locally or remotely, such as, for example, at the remote monitoring center 30.

The control circuitry 20 coupled to the sensor 12 is adapted to facilitate excitation of one or more resonating devices (FIG. 2) of the sensor 12 to oscillate the resonating devices at its own frequency. The details of this excitation and the resultant oscillations are discussed further below.

In the exemplary embodiment, the communication circuitry 26 receives data signals 32 from the processing circuitry 24 and transmits the data signals 32 to a remote location, such as the illustrated remote monitoring center 30. The communication circuitry 26 comprises hardware or software that enables the communication circuitry 26 to communicate the data signals 32 to the remote monitoring center 30. In one embodiment, communication circuitry 26 is configured to communicate the data signals to the remote monitoring center 30 in accordance with a cellular protocol. In another embodiment, communication circuitry 26 is configured to communicate the data signals 32 to the remote monitoring center 30 in accordance with a wireless protocol. In yet another embodiment, communication circuitry 26 is configured to communicate the data signals 32 to the remote monitoring center 30 in accordance with a radio frequency protocol. Of course, those of ordinary skill in the art will appreciate that any number of communication protocols can be employed.

Figure 2:
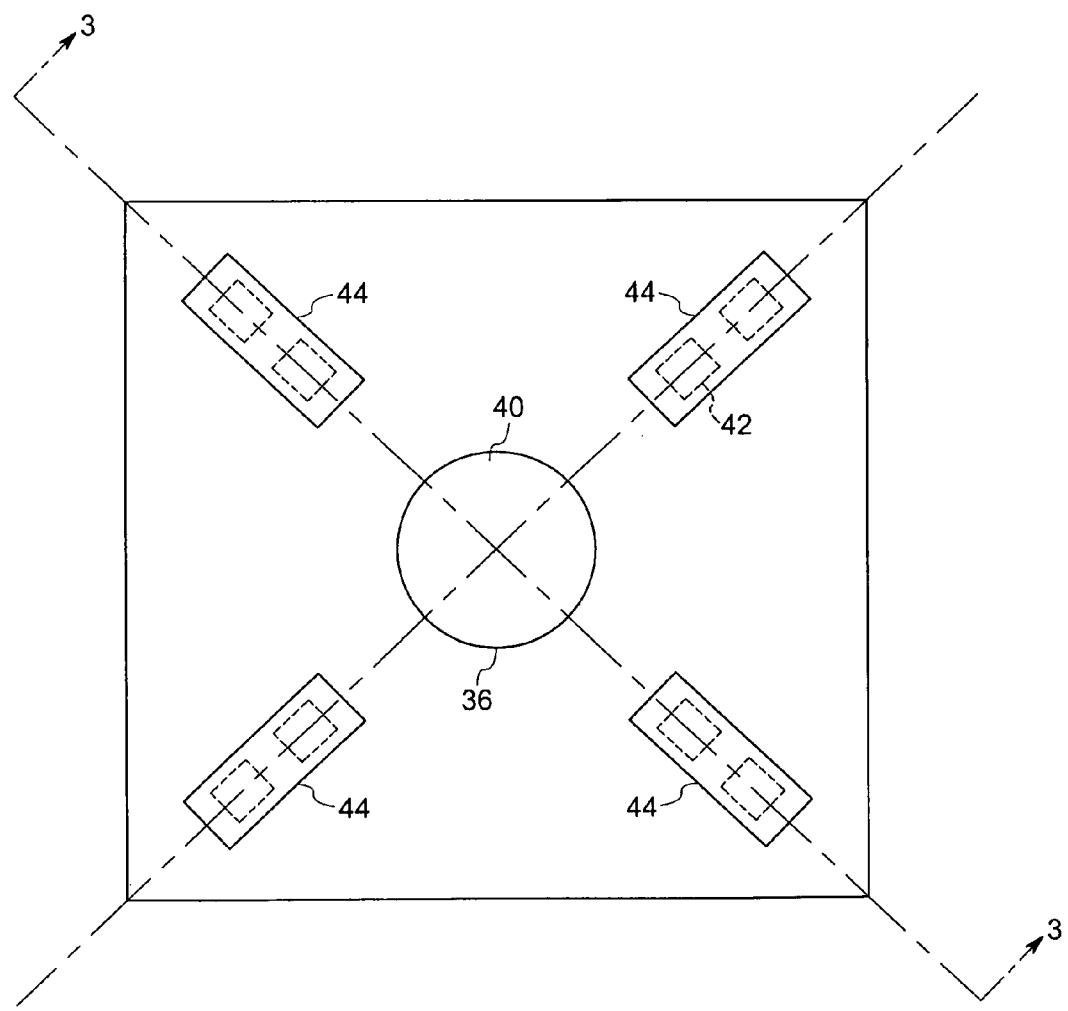
FIG. 2 is a top view of a differential pressure sensor constructed in accordance with an exemplary embodiment of the present technique.

FIG. 2 illustrates a top view of a differential pressure sensor 12. The differential pressure sensor 12 includes a membrane layer 36 that has a covered portion 38 (FIG. 3) and an exposed portion 40. The sensor further includes at least one resonating device 42 that is secured to the covered portion of the membrane layer 36 and that is configured to oscillate at a desired frequency upon external actuation. The exposed portion 40 is directly in communication with the pressurized environment, whereas the covered portions are not directly exposed to the pressurized environment. In other words, the membrane layer 36 presents the covered portion that is isolated from the pressurized environment and an exposed portion 40 that is exposed to the pressurized environment.

In order to reduce damping with respect to the pressurized environment and to have high quality factor (Q factor) of the resonating devices 42, the resonating devices 42 are vacuum-sealed within vacuum chambers 46. That is, the resonating devices 42 are isolated from the pressurized environment in a vacuum chamber 46 that is at least partially defined by the cap layer 44. Thus, there is less chance of the resonating devices 42 being damaged due to the impact of direct pressure. Moreover, the vacuum chambers 46 facilitate an improvement in the quality factor of the measurement taken. The resonating devices 42 may be disposed radially along the four sides of the membrane layer 36. This radial arrangement allows radial detection of strains, thus improving the sensitivity and resolution of the sensor 12. Furthermore, the cap layer 44 covers the resonating devices 42 and also parts of the membrane layer 36, leaving only a relatively small portion 40 of the membrane layer 36 exposed to the pressurized environment. Thus, the cap layer 44 acts as a housing that substantially surrounds the membrane layer 36.

While in the illustrated embodiment the differential pressure sensor 12 is shown as including four resonating devices 42 and having a circular exposed portion 40 of the membrane layer 36, this illustrated embodiment and arrangement should in no way be considered limiting. In certain other implementations of the present technique, the differential pressure sensor 12 may include fewer or more resonating devices 42 and the exposed portion 40 of the membrane layer 36 may be of any appropriate shape in order to detect a differential pressure within the pressurized environment.

FIG. 3 is and cross-sectional representation of the differential pressure sensor 12 of FIG. 2 taken along line 3—3. In the illustrated embodiment, the differential pressure sensor 12 comprises resonating devices 42 that are disposed radially about the covered portion 38 of the membrane layer 36. The resonating devices 42 are disposed on mesas 45 formed by etching the membrane layer 36, as discussed further below. These mesas 45 are extended portions of the membrane layer 36 formed by using a suitable etchant on the membrane layer 36. These mesas 45 facilitate conversion of the deflection of the membrane layer 36 from the Z direction (out of plane) to the X direction (in plane). One or more Back-Etched Silicon On Insulators (BESOIs) may be formed corresponding to the etched regions (e.g., mesas 45) on the membrane layer 36. The BESOIs are sometimes referred to as wafers, and the BESOIs are bonded with the membrane layers 36 to establish contact with one another. That is, changes in the membrane layer 36 due to pressure effects the BESOIs through the bonded nature therebetween and facilitates the detection of differential pressure in the pressured environment.

The resonating devices 42 are vacuum-sealed in the vacuum chamber 46 that is defined by the cap layer 44 and the membrane layer 36. Advantageously, the vacuum chamber 46 isolates the resonating devices 42 from undesired external disturbances, for example. In the exemplary sensor 12, only the exposed portions 40 of the membrane layer 36 will be exposed to the pressures in the pressurized environment and, therefore, the resonating device 42 will not be under the direct influence of the differential pressure in the pressurized environment. This advantageously, protects the resonating devices 42 from getting damaged due to sudden high pressure and high temperature in the environment, for instance.

Typically, the resonating devices 42 reside on mesas 45, and the mesas 45 convert the Z direction (parallel to the direction of applied pressures) of movement of the membrane layer 36 to the X direction (perpendicular to Z). Typically, mesas 45 are hill like structures having a flat top and steep sides. The mesas 45 facilitate translation of movement (i.e., deformation) of the membrane layer 36 in the Z direction to an effected movement in the X direction, which is perpendicular to the Z direction. Moreover, the elasticity of the membrane layer 36 can be used to control the rigidity of the membrane layer 36 and hence the freedom of movement. Varying geometry and the dimension of the hinged regions of the membrane layer 36 can minimize the stress concentration near the corners of the membrane layer 36. As discussed further below, when the membrane layer 36 deforms due to differential pressure, the frequency of oscillation of the resonating devices changes. This change in the frequency of oscillation is indicative of the pressures within the environment.

The membrane layer 36 may be made of monocrystalline silicon, which presents beneficial mechanical properties and a high intrinsic Q factor. By way of background, the Q factor of a resonating structure is a measure of the total energy of the system per cycle compared to the energy losses of the resonating device 42 and is also the measure of a sensor's resolution and short-term stability. Silicon's high stiffness to density ratio also promotes a higher resonance frequency compared to metal, which results in faster response time and simplifies signal conditioning.

Figure 4:
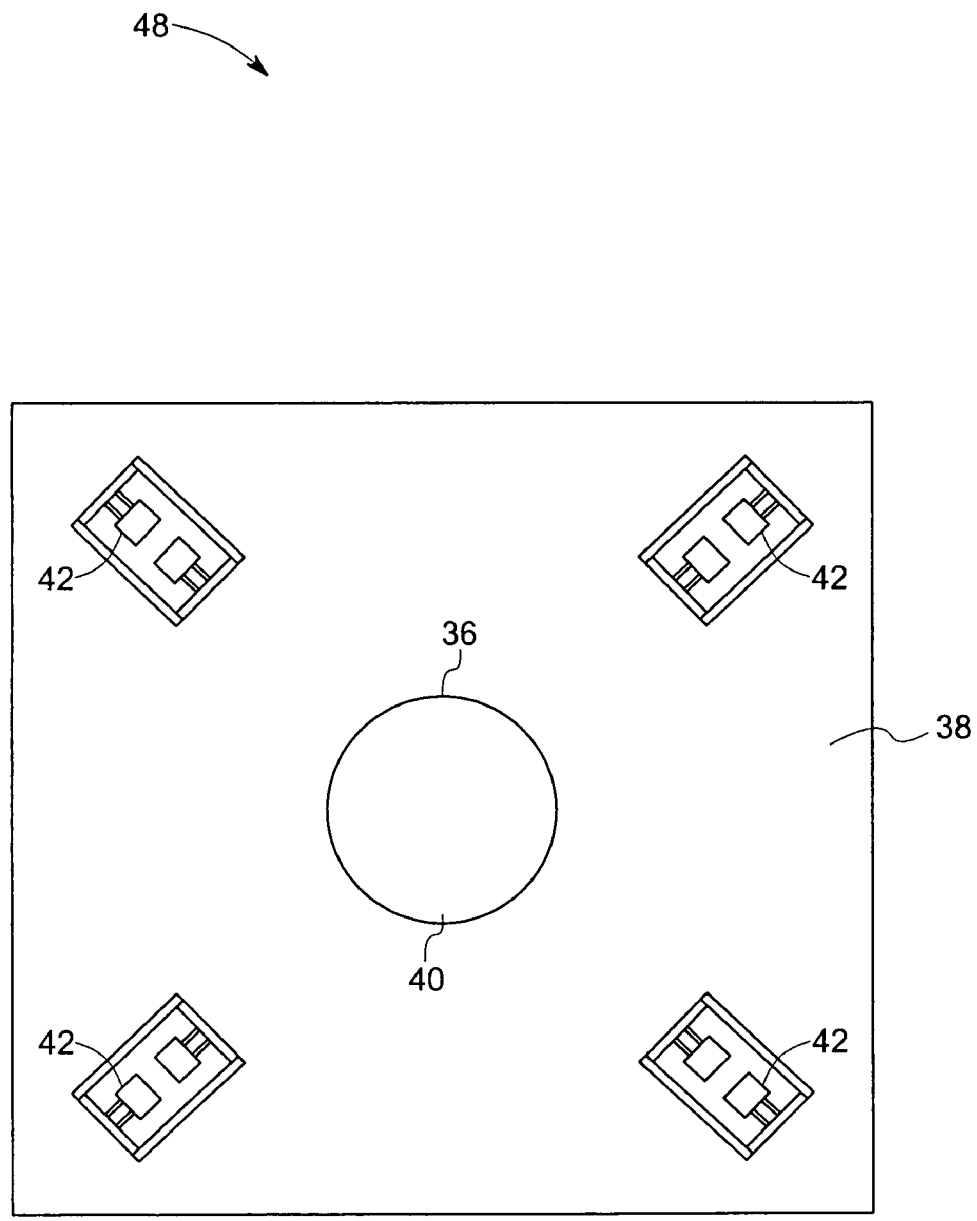
FIG. 4 is a top view of a resonating wafer device disposed on a membrane layer of a differential pressure sensor in accordance with an exemplary embodiment of the present technique.

FIG. 4 is a diagrammatical representation of a resonating wafer device 48 of an exemplary resonating device disposed on a membrane layer of a differential pressure sensor, in accordance with an exemplary embodiment of the present technique. In the illustrated, exemplary embodiment, the resonating device 42 comprises a piezo-electric material or piezo-resistive material that converts energy from one input form to a different output form. For instance, the piezo-electric material coverts electrical inputs into mechanical outputs, specifically oscillations of the material. By way of example, piezo-electric materials include thin polymer films, single crystal materials, or other piezo-electric element structures. These materials are used to form structures that are easily excited from a vibration input, such as the detector voltage or current, which is provided from an electrical power source. The vibration input to the resonating devices 42 may be at a single discrete frequency, a combination of frequencies, or broadband vibration with a very large number of frequencies.

FIG. 5 is a diagrammatical representation 50 of the differential pressure sensor 12 located in an environment experiencing no differential pressure. The pressure sensing circuitry 22 measures the changes in oscillations of the resonating device 42, and this change is indicative of deformation in the membrane layer 36, which, in turn, indicates the pressure difference (i.e. the difference between pressures $P_1$ and $P_2$ applied on opposite sides of the membrane layer 36). The detector voltage or the current, which is the vibration input to the resonating device 42, activates the resonating device 42 for vibrating the resonating device 42 at its resonant or natural frequency. As illustrated, $P_1$ is equal to $P_2$, and thus there is no pressure differential. In turn, net forces on the exposed portion on the membrane layer 36 are zero, and the membrane layer 36 does not flex. Thus, the resonating device 42 oscillates at its natural frequency.

During instances when $P_1$ differs from $P_2$, there exists a differential pressure. This differential pressure causes the membrane layer 36 to flex. Flexing of the membrane layer 36 causes a change in the frequency of the resonating device 42, and this difference in the resonant frequency of oscillation of the resonating device 42 changes the detector voltage or current and is taken as a measure for the differential pressure. As will be appreciated by those skilled in the art, a capacitive transducer can also be used for similar applications in detecting change in resonating frequencies.

FIG. 6 is a diagrammatical representation 52 of the differential pressure sensor 12 within an environment having a differential pressure. The membrane layer 36 deforms due to the differential pressure, and this deformation is then transmitted to the resonating device 42, thus changing the frequency of resonance of the resonating device 42 and this difference in the frequency facilitates measurement of the differential pressure. The resonant frequency of the resonating devices 42 changes (increases or decreases) depending on the deformation of the membrane layer 36. It is worth noting that in the present figure, the deformation of the membrane layer in the covered portion has been exaggerated for the purposes of illustration. However, in actual implementations, the deformation of the membrane layer inside the covered portion may be very nominal with respect to the deformation of the membrane layer on the exposed portion of the membrane layer.

By way of example, if $P_1$ is greater than $P_2$, the membrane layer 36 flexes downwards as indicated in FIG. 6. As the resonating devices 42 are also connected to the membrane layer 36, this downward deformation of the membrane layer 36 changes the resonant frequency of the resonating devices 42, which was originally vibrating at its natural frequency. These differential pressure sensors have long-term stability, since the resonance frequency is not dependent on unstable or drifting electrical signals, but rather the mechanical properties of the membrane layer 36.

One or more resonating devices 42 may be disposed radially along the membrane layer 36 to provide a symmetrical configuration. In addition to this, multiple resonating devices 42 can give better results and also increase the accuracy of the data. However, any other arrangement of the resonating devices 42 may also be used. In the illustrated embodiment, the sensor 12 can withstand high static pressure and at the same time measure low differential pressure. Moreover, the resonating devices 42 are placed on the covered portion 38 of the membrane layer 36 under vacuum environment to reduce damping. The differential pressure sensor 12 may be capable of withstanding a high static pressure of up to about 5000 pound per square inch (psi) without appreciable stresses in the silicon and measuring a differential pressure in the range of about 0.1 pound per square inch (psi) to about 15 pound per square inch (psi) with 0.01% accuracy.

In another exemplary embodiment of the present technique, a plurality of channels (not shown for clarity) may be placed on the exposed portion 40 of the membrane layer 36 to direct the pressure in the horizontal direction. These channels act as guides for the flow of pressures in horizontal direction with respect to the membrane layer 36.

Figure 7:
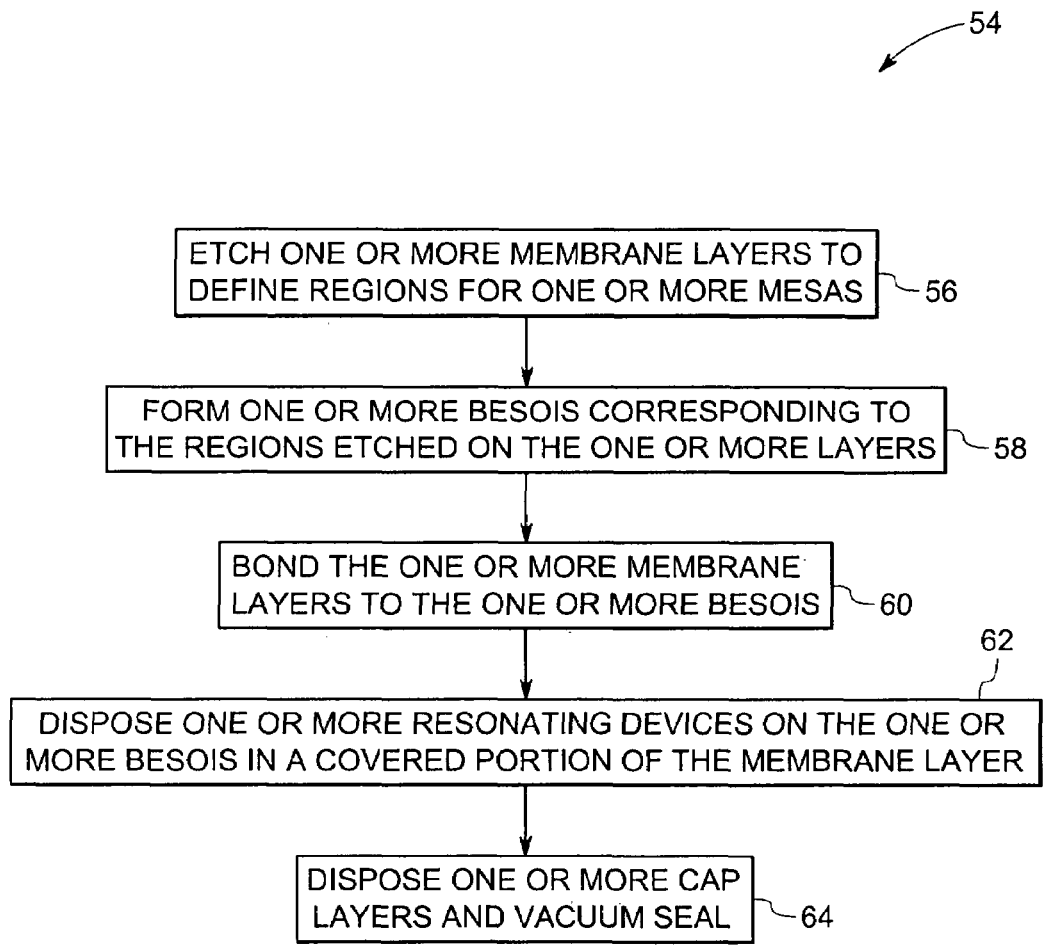
FIG. 7 illustrates method steps for manufacturing a differential pressure sensor, in accordance with an exemplary embodiment of the present technique.

FIG. 7 is a flow chart illustrating an exemplary method of manufacturing the differential pressure sensor 12 represented generally by reference numeral 54. First, at Step 56, etching of one or more membrane layers 36 is done for defining regions for mesas 45. The mesas 45 are configured for converting the deflection of the membrane layer 36 from the Z direction to the X direction as discussed above. Typically the resonating devices 42 are disposed on the mesas 45. At Step 58, one or more Back-Etched Silicon On Insulators (BESOIs) are formed corresponding to the one or more regions etched on the membrane layer 36. At block 60, the one or more BESOIs are bonded with the one or more membrane layers 36, wherein the BESOIs and the membrane layers 36 establish contact with one another or more BESOIs. At this point in time, the one or more resonating devices 42 are disposed on the one or more BESOIs at Step 62. At Step 64, a cap layer is placed on top of the resonating devices 42 and the resonating devices 42 are vacuum-sealed. As discussed earlier, the membrane layer 36 comprises a covered portion 38 and an exposed portion 40, and the resonating devices 42 are disposed on the covered portion 38 of the membrane layer 36 formed by the cap layers. This process is repeated to form another set of membrane layers 36, and the two membrane layers 36 are joined together to form one single membrane layer 36, which forms the differential pressure sensor 12. The membrane layer 36 is usually made of silicon or any similar materials known in the art. The BESOIs is made out of a combination of silicon oxide and silicon. Initially, during the etching process, the silicon is first etched followed by etching of silicon oxide using different etching mediums known in the art. It should be noted that though, reference is made in the present embodiment to the method of etching the membrane layer, methods such as fusion bonding or anodic bonding or similar method known in the art may also be used in the above process.

Figure 8:
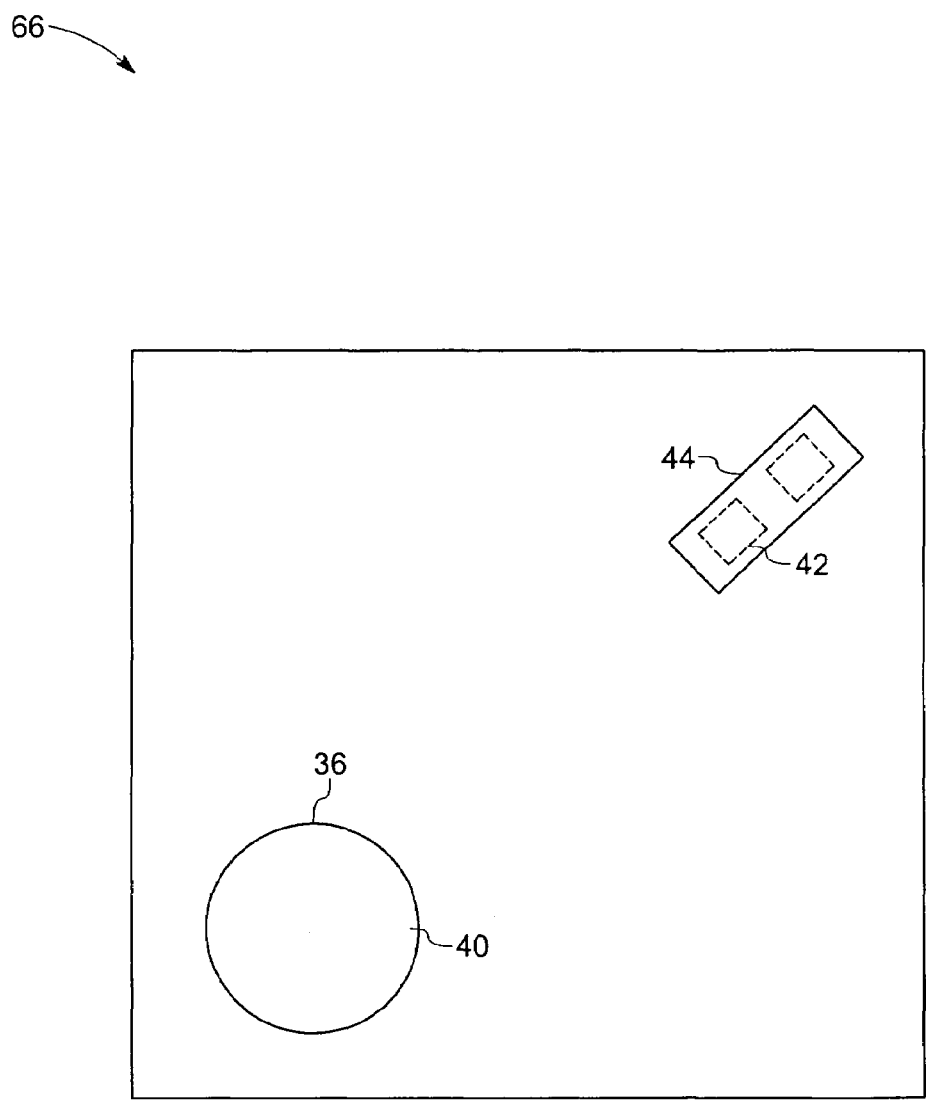
FIG. 8 is a top view of a differential pressure sensor in accordance with an exemplary embodiment of the present technique.

FIG. 8 illustrates a differential pressure sensor 66. In the previous embodiment (example as illustrated in FIG. 3), the differential pressure sensor 12 had the exposed portion 40 of the membrane layer 36 disposed centrally between at least two or more resonating devices 42. In the embodiment illustrated in FIG. 8, the exposed portion 40 of the membrane layer 36 in the differential pressure sensor 66 is disposed off-center with respect to the differential pressure sensor 66 and having at least one resonating device 42 disposed on the covered portion 38 of the membrane layer 36. However, it should be noted, though only a single resonating device 42 is indicated in FIG. 8, multiple resonating devices 42 may be used in this particular arrangement.

Advantageously, the present embodiment would be desired in certain exemplary conditions to realize a torsional effect. Operating in torsion is likely to increase the sensitivity in terms of displacement for a given pressure difference as compared to membrane layer 36 constrained in all directions. The membrane layer 36 needs to be sealed along the edges using an elastic material to isolate the two high-pressure regions. The elasticity of the membrane layer 36 can be used to control the rigidity of the membrane layer 36 and hence the freedom of movement. Varying geometry and the dimension of the hinged regions of the membrane layer 36 can minimize the stress concentration near the corners of the membrane layer 36.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A differential pressure sensor for use in a pressurized environment, comprising:
    a first housing layer having a first aperture extending therethrough;
    a second housing layer having a second aperture extending therethrough;
    a membrane layer disposed between the first and second housing layers and including:
        a covered portion covered by either the first or second housing layers or a combination thereof; and
        an exposed portion, wherein a first side of the exposed portion of the membrane layer is in fluid communication with the first aperture and a second side of the exposed portion of the membrane layer is in fluid communication with the second aperture;
    at least one resonating device disposed on the covered portion and coupled to the membrane layer, wherein the at least one resonating device is configured to oscillate at a desired frequency; and
    sensing circuitry configured to detect oscillation in the at least one resonating device indicative of deformation in the membrane layer.

2. The differential pressure sensor as recited in claim 1, wherein the membrane layer is composed of a semiconductive material.

3. The differential pressure sensor as recited in claim 1, wherein the at least one resonating device is configured to be excited by an external detector voltage or current via control circuitry.

4. The differential pressure sensor as recited in claim 1, wherein the exposed portion of the differential pressure sensor is asymmetrically located with respect to the covered portion.

5. The differential pressure sensor as recited in claim 1, wherein the at least one resonating device comprises a piezoelectric material.

6. The differential pressure sensor as recited in claim 1, wherein the at least one resonating device is disposed in a vacuum environment.

7. A differential pressure sensor for use in a pressurized environment, comprising:
    a housing having a first side and an opposing second side;
    a membrane layer substantially surrounded by the housing, wherein the membrane layer has a covered portion isolated from the pressurized environment and an exposed portion exposed to the pressurized environment;
    at least one resonating device disposed within the covered portion of the membrane layer; and
    sensing circuitry coupled to the at least one resonating device and configured to detect changes in oscillation of the at least one resonating device indicative of deformation in the membrane layer.

8. The differential pressure sensor as recited in claim 7, wherein the at least one resonating device is disposed closer to a perimetric edge of the housing than the exposed portion of the membrane layer.

9. The differential pressure sensor as recited in claim 7, wherein the at least one resonating device is configured to be excited by an external detector voltage or current via a control circuitry.

10. The differential pressure sensor as recited in claim 7, wherein the membrane layer is composed of a semiconductive material.

11. The differential pressure sensor as recited in claim 7, wherein the exposed portion of the differential pressure sensor is asymmetrically disposed with respect to the covered portion.

12. A system for sensing pressure, comprising:
    a housing comprising a first side and an opposing second side; and a differential pressure sensor for use in a pressurized environment comprising:
  a membrane layer substantially surrounded by the housing, wherein the membrane layer has a covered portion isolated from the pressurized environment and an exposed portion exposed to the pressurized environment;
  at least one resonating device disposed closer to a perimetric edge of the housing than the exposed portion of the membrane; and
  sensing circuitry coupled to the at least one resonating device and configured to detect changes in oscillation of the at least one resonating device.

13. The system as recited in claim 12, wherein the at least one resonating device is disposed on the covered portion of the membrane layer.

14. The system as recited in claim 12, comprising signal processing circuitry adapted to process the deformation detected by the sensing circuitry.

15. The system as recited in claim 12, wherein the sensing circuitry is configured to receive a signal indicative of the deformation of the membrane layer.

16. The system as recited in claim 12, comprising communication circuitry configured to communicate with a remote location.

17. The system as recited in claim 12, wherein the exposed portion of the differential pressure sensor is asymmetrically disposed with respect to the covered portion.

* * * * *

UNITED STATES PATENT AND TRADEMARK OFFICE
Certificate

Patent No. 7,017,418 B1                                                    Patented: March 28, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Parag Thakre, Bhilai (IN); Shankar Chandrasekaran, Chennai (IN); Kuna Venkat Satya Rama Kishore, Bangalore (IN); Russell William Craddock, Nuneaton (GB); and Kanakasabapathi Subramanian, Clifton Park, NY (US).

Signed and Sealed this Twenty-fifth Day of December 2007.

<div style="text-align:right">

HEZRON WILLIAMS
*Supervisory Patent Examiner*
Art Unit 2856

</div>